B. S. KURTZ.
SPEED CHANGING MECHANISM.
APPLICATION FILED MAR. 23, 1917.

1,249,779.

Patented Dec. 11, 1917.

INVENTOR
Barton S. Kurtz
BY
Diedersheim & Fairbanks
ATTORNEYS

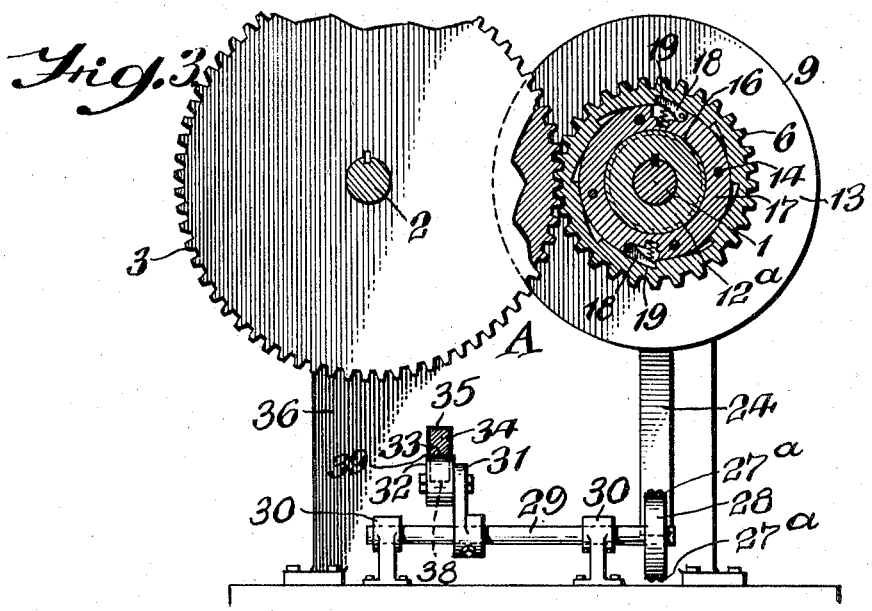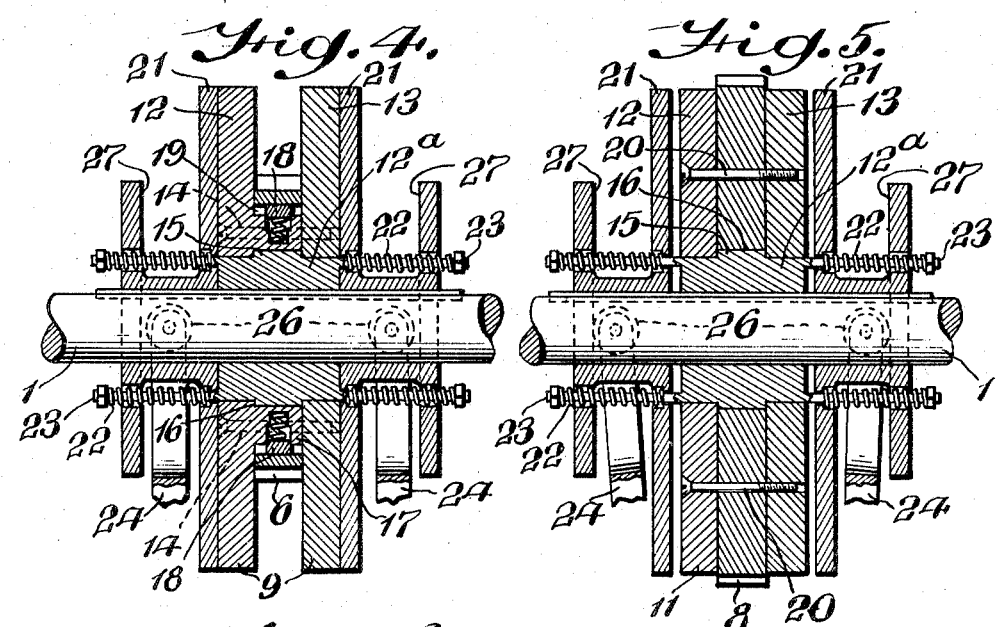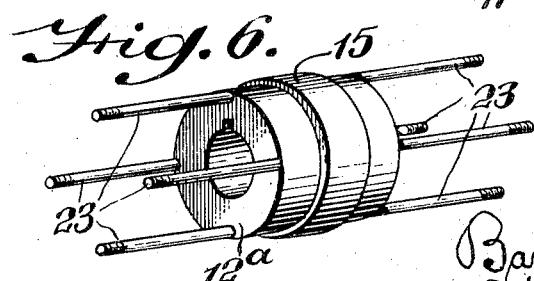

UNITED STATES PATENT OFFICE.

BARTON S. KURTZ, OF GAP, PENNSYLVANIA.

SPEED-CHANGING MECHANISM.

1,249,779.

Specification of Letters Patent.

Patented Dec. 11, 1917.

Application filed March 23, 1917. Serial No. 156,816.

*To all whom it may concern:*

Be it known that I, BARTON S. KURTZ, a citizen of the United States, residing at Gap, in the county of Lancaster, State of Pennsylvania, have invented a new and useful Speed-Changing Mechanism, of which the following is a specification.

My invention relates to speed changing mechanism to be used in connection with all classes of machines where different speeds are required with the main source of motion of a uniform character, and is especially adapted for use with automobiles of the gasolene burning type, interposed between the driving shaft of the engine and the driven shaft or axle and consisting mainly of several gear units of different speed ratios, with the gears on the driven shaft fixed thereto, and in constant mesh with gears loosely mounted on the driving shaft and forming a part of the speed changing mechanism.

A further object of my invention is to provide speed changing mechanism wherein the gears on the driven shaft are fixed thereto and in constant mesh with gears loosely mounted on the driving shaft with the device normally in a neutral position, and means for holding any one of the gears on the driving shaft in a fixed relation to revolve therewith to transmit motion to the driven shaft at the desired speed.

A still further object of my invention is to provide a speed changing mechanism interposed between the driving and driven shaft with elastic connecting means between the driving shaft, and the gears loosely mounted thereon to allow for a yielding movement between gears of the several gear units when changing the speed.

It further consists of other novel features of construction, all as will be hereinafter more fully set forth.

For the purpose of illustrating my invention, I have shown in the accompanying drawings, a typical embodiment of it, which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 3 represents a section on the line 3—3 of Fig. 1, showing the elastic connecting means between the gears of the change speed mechanism and the driving shaft, with the gear member thereof positioned to loosely revolve on a collar fixed to the driving shaft.

Figure 1:
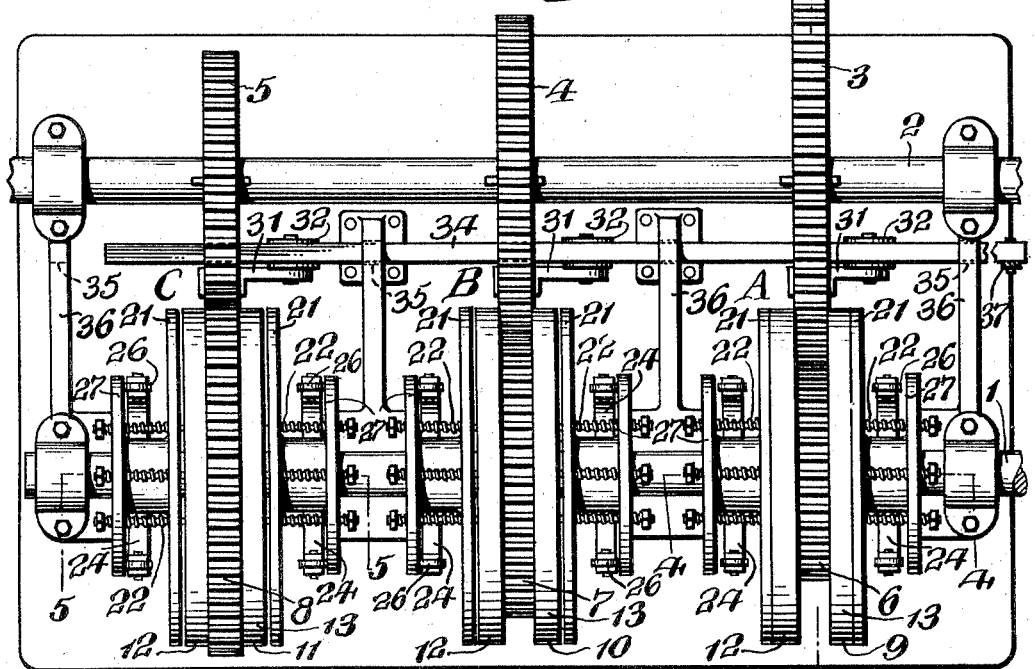
Figure 1 represents a top plan view of my improved speed changing mechanism showing the gear of the low speed ratio in a locked relation to the driving shaft and transmitting motion to the driven shaft or axle.

Fig. 4 represents a section on the line 4—4 of Fig. 1, showing the collar fixed to the driving shaft with the gear member of the speed change mechanism loosely positioned to revolve thereon, longitudinally movable contact disks revolubly fixed to the driving shaft located adjacent to said gear members and adapted to be selectively moved into contact with the gear members to hold the selected gear member in a fixed relation to the driving shaft.

Fig. 5 represents a section on the line 5—5 of Fig. 1, through the gear unit of the high speed ratio which is of a slightly different construction in that the elastic connection between the gear member and the driving shaft is eliminated.

Fig. 6 represents a perspective view of one of the collars adapted to be fixed to the driving shaft and on which is loosely positioned one of the gear members of the speed changing mechanism.

Similar numerals of reference indicate corresponding parts in the figures.

Referring to the drawings.

1 designates the driving shaft, 2 the driven shaft or axle between which my improved speed changing mechanism is interposed and consists namely of a plurality of gear units, the drawings illustrating the three gear units, A, B, C, representing low, intermediate and high speed ratios, with gears 3, 4, 5 thereof fixed to the driven shaft and constantly intermeshing with the gears 6, 7, 8, of the gear members 9, 10, 11, loosely positioned on the driving shaft and forming a part of the speed changing mechanism.

As the speed changing mechanism of the different gear units are of the same construction, the description of one will answer for all, with the exception of a slight modification in the gear member 11 of the high speed unit, which will hereinafter be referred to.

For the purpose of description, I will refer to the gear unit A of the low speed ratio which consists of the gear 3 of a large pitch diameter fixed to revolve with the driven shaft 2 and in constant mesh with the gear 6 of a smaller pitch diameter loosely mounted on the driving shaft 1, and forming a part of my improved speed changing mechanism.

The mounting of the gear member 9 on the driving shaft 1, comprises a collar 12ª fixed to revolve with the driving shaft 1 and on which the gear member 9 is loosely mounted to revolve independent of the driving shaft 1, said gear member consisting of the disk members 12 and 13, secured together by the bolts 14 and held against longitudinal movement by the shouldered portion 15 of the collar 12ª engaging in the groove 16 formed by the disk members 12 and 13.

The disk 12 is provided with the hub extension 17 on the periphery of which the spring pressed pawls 18 are located and engage the internal ratchet 19 of the gear 6 to hold the same to move with the gear member when said gear is operated to transmit motion from the driving shaft to the driven shaft. This ratchet and pawl connection between the disks 12 and 13 of the gear members 9 and 10 and the gears 6 and 7 allows for an overrunning of the smaller gear when changing to a gear of a higher speed ratio.

In the high speed unit the gear member 11 comprises the gear 8 secured between and in a fixed relation to the disks 12 and 13 by the bolts 20, with the ratchet and pawl connection between the gear and the driving shaft 1 eliminated, there being no necessity for an overrunning device in connection with the gear of the highest speed ratio, such means being effected in the preceding gear of a smaller speed ratio.

Located adjacent the gear members 9, 10, 11 are the contact disks 21 keyed to revolve with and longitudinally movable on the driving shaft 1 and adapted to be moved into contact with the disks 12 and 13 of the gear members to hold the same to revolve with the driving shaft.

Springs 22 on the studs 23 of the collar 12ª exert a pressure against the contact disks 21 to move and hold them into contact with the gear members 9, 10 and 11, when the device is being operated.

Normally, that is when the device is in a neutral position, the disks 21 are held in an inoperative position and out of contact with the gear members 9, 10, 11 by outward thrust of the upper ends of the bifurcated rocking arms 24 fulcrumed at 25 to a stationary element of the device. The said upper ends of the said arms 24 are provided with rollers 26 to engage the inner faces of the flanges 27 of the disks 21 while secured to the lower ends of the said arms are the eccentric straps 27ª adapted to extend around a portion of the periphery of the wheel 28 and attached thereto to impart a rocking motion to the said arms 24 when the wheels 28 are revolved.

The wheels 28 are fixed to the stud shafts 29 mounted to revolve in the stationary bearings 30 to these stud shafts 29 are also secured the crank arms 31 provided with the rollers 32 adapted to engage the cam surface 33 of the shiftable cam bar 34 positioned in the opening 35 of the stationary element 36 and adapted to be shifted by the operator through suitable lever connection 37.

The cam surface 33 of the shiftable cam bar 34 consists of a dwell or inoperative cam surface 38 on which the rollers 32 of the contact disk actuating arms engage to swing the upper ends of the arms 24 outward to hold the contact disks 21 in inoperative position in relation to the gear members 9, 10, 11 loosely mounted on the driving shaft 1.

At predetermined distances along the cam surface 38, operative cam surfaces 39, 40, 41 representing the low, intermediate and high speed ratios are provided to allow for the rollers 32 to selectively engage therein when the cam bar 34 is shifted to relieve the outward thrust of the upper ends of the arms 24 against the contact disks 21 and allow the springs 22 to move the said contact disks into contact with the gear member of a corresponding speed ratio to the operative cam surface selected to hold the said gear member to revolve with the driving shaft 1 and transmit motion of the desired speed to the driven shaft or axle.

In the operation of my speed changing mechanism the operator controls the transmission of motion from the driving shaft 1 to the driven shaft or axle 2 through the medium of the shiftable cam bar 34 provided with the dwell or inoperative cam surface 38, and the operative cam surfaces 39, 40, 41, representing the low, intermediate and high speed ratios.

Normally the device is in a neutral position with the rollers 32 of the contact disk control mechanisms engaging the inoperative cam surface 38 to hold the contact disks 21 out of contact with the gear members 9, 10, 11 allowing the gear members to be loose on the revolving driving shaft.

Figure 2:
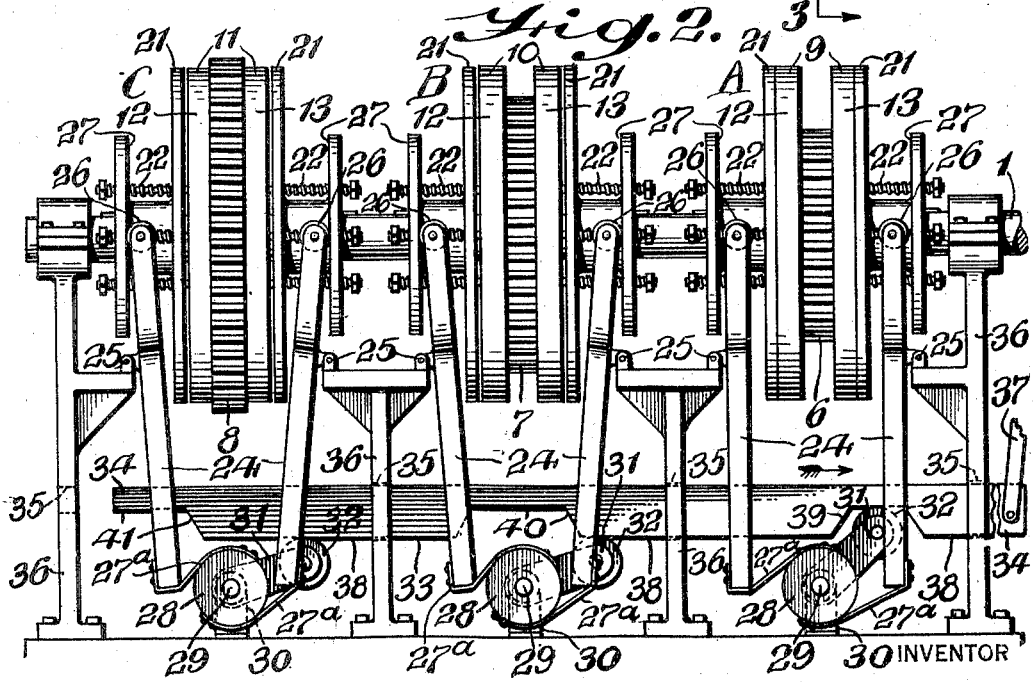
Fig. 2 represents a front elevational view of Fig. 1, showing the shiftable cam bar and mechanism operated thereby in operative connection with the gears on the driving shaft.

When it is desired to transmit motion of a desired speed ratio, the operator shifts the cam bar 34 in the direction indicated by the arrow, Fig. 2 of the drawings, to cause the roller 32 of the contact disk control mechanism of the gear unit A of the low speed ratio to ride from the inoperative cam surface 38 into the operative cam surface 39 representing the low speed ratio, as illustrated in Fig. 2 of the drawings, causing the rocking arms 24 to relieve their outward thrust against the contact disk 21 to allow the springs 22 to move the contact disks into contact with the gear member 9 to hold the same in a fixed relation to the driving shaft 1 to transmit motion of the low speed ratio to the driven shaft or axle 2 for traction purposes.

In changing from one speed to another the operator shifts the shiftable cam bar 33 to successively cause the rollers 32 of the different speed ratio control mechanisms to engage in their respective cam surfaces 39, 40, 41, representing the low, intermediate and high speed ratios.

Having thus described my invention what I claim as new and desire to secure by Letters Patent, is:—

1. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, contact disks revolubly secured to and longitudinally movable on said driving shaft, and cam means to operate said contact disks to contact with the loose gear of the selected gear unit to hold the same to revolve with the driving shaft and form a driving connection between the driving and driven shafts, and means in connection with the gears on said driving shaft to allow for the overrunning of any one of said gears of a lower speed ratio in changing to a gear of a higher speed ratio in the operation of the device.

2. A speed changing mechanism comprising a driving shaft, a driven shaft, intermeshing gear units of different speed ratios connecting said shafts, the gears of each unit being always in mesh, one gear of a unit being fixed to the driven shaft, another gear of the same unit loose on said driving shaft, contact disks revolubly secured to and longitudinally movable on said driving shaft, and means to operate said contact disks to contact with the loose gear of the selected gear unit, and means in connection with the gears on said driving shaft to allow for the overrunning of any one of said gears of a lower speed ratio in changing to a gear of a higher speed ratio in the operation of the device.

3. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, spring pressed contact disks revolubly secured to and longitudinally movable on said driving shaft, and cam means to operate said contact disks to contact with the loose gear of the selected gear unit to hold the same to revolve with the driving shaft and form a driving connection between the driving and driven shafts, and means in connection with the gears on said driving shaft to allow for the overrunning of any one of said gears of a lower speed ratio in changing to a gear of a higher speed ratio in the operation of the device.

4. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, spring pressed contact disks revolubly secured to and longitudinally movable on said driving shaft, rocking arms normally holding the said disks out of contact with the said gear, and cam means to operate said rocking arms to allow the contact disks to contact with the loose gear of the selected gear unit to hold the same to revolve with the driving shaft and form a driving connection between the driving and the driven shaft, and means in connection with the gears on said driving shaft to allow for the overrunning of any one of said gears of a lower speed ratio in changing to a gear of a higher speed ratio in the operation of the device.

5. A speed changing mechanism comprising a driving shaft, a driven shaft, intermeshing gear units of different speed ratios connecting said shafts, the gears of each unit being always in mesh, one gear of a unit being fixed to the driven shaft, another gear of the same unit loose on said driving shaft, means for holding said loose gear against longitudinal movement on said driving shaft, spring pressed contact disks adjacent said gear, said spring pressed contact disks revolubly secured to and longitudinally movable on said driving shaft, rocking arms normally holding the said spring pressed disks out of contact with the said gear, and cam means to operate said rocking arms to relieve outward thrust against said spring pressed contact disks and allow the spring pressed contact disks to contact with said loose gear of the selected gear unit, and means in connection with the gears on said driving shaft to allow for the overrunning of any one of said gears of a lower speed ratio in changing to a gear of a higher speed ratio in the operation of the device.

6. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, contact disks revolubly secured to and longitudinally movable on said driving shaft, and cam means to successively operate said contact disks to contact with the loose gears on the driving shaft to form a driving connection of the desired speed ratio between the driving and driven shafts, and means in connection with the gears on said driving shaft to allow for the overruning of any one of said gears of a lower speed ratio in changing to a gear of a higher speed ratio in the operation of the device.

BARTON S. KURTZ.

Witnesses:
J. LLOYD HUNSECKER,
S. V. HUNSECKER.